United States Patent
Fang et al.

(10) Patent No.: US 9,228,595 B2
(45) Date of Patent: Jan. 5, 2016

(54) GAS-LIQUID AUXILIARY SUPPORTER FOR A DRY GRANULATOR

(75) Inventors: Zheng Fang, Wenzhou (CN);
Tongcheng Xu, Wenzhou (CN);
Yongxing Chen, Wenzhou (CN)

(73) Assignee: Zhejiang Canaan Technology Limited, Wenzhou (CN)

( * ) Notice: Subject to any disclaimer, the term of this patent is extended or adjusted under 35 U.S.C. 154(b) by 428 days.

(21) Appl. No.: 13/808,012

(22) PCT Filed: Dec. 26, 2011

(86) PCT No.: PCT/CN2011/084623
§ 371 (c)(1),
(2), (4) Date: Jan. 2, 2013

(87) PCT Pub. No.: WO2012/146039
PCT Pub. Date: Nov. 1, 2012

(65) Prior Publication Data
US 2013/0104731 A1    May 2, 2013

(30) Foreign Application Priority Data

Apr. 27, 2011  (CN) .......................... 2011 1 0106377

(51) Int. Cl.
*F15B 11/072* (2006.01)
*F15B 13/00* (2006.01)
*B01J 2/00* (2006.01)

(52) U.S. Cl.
CPC ... *F15B 13/00* (2013.01); *B01J 2/00* (2013.01)

(58) Field of Classification Search
CPC .. F15B 11/072; F15B 11/032; F15B 11/0725; F15B 13/00; F15B 2211/216; F01B 7/02; F01B 7/20; E21D 15/44
USPC .................... 91/168, 169, 4 R; 92/61; 60/593
See application file for complete search history.

(56) References Cited

U.S. PATENT DOCUMENTS

| | | | |
|---|---|---|---|
| 6,409,482 B1 | 6/2002 | Fon | |
| 6,807,748 B2 | 10/2004 | Bryan et al. | |
| 2009/0282971 A1* | 11/2009 | Giesen | ................. 92/62 |

FOREIGN PATENT DOCUMENTS

CN         2441549 Y        8/2001

(Continued)

OTHER PUBLICATIONS

International Search Report issued in PCT/CN2011/084623 mailed Mar. 29, 2012 (6 pages).

(Continued)

*Primary Examiner* — Nathaniel Wiehe
*Assistant Examiner* — Dustin T Nguyen
(74) *Attorney, Agent, or Firm* — Osha Liang LLP

(57) ABSTRACT

The present invention provides a gas-liquid auxiliary supporter for dry granulator including a hydraulic cylinder housing, a lower air piston, a plunger, an upper cover and an upper air piston, wherein the hydraulic cylinder housing is arranged with a hydraulic oil inlet, the lower air piston is arranged with an oil channel for hydraulic oil to flow through, an opening at one end of the oil channel connects to the hydraulic oil inlet on the hydraulic cylinder housing, while an opening at the other end of the oil channel is arranged on the lower end face of the lower air piston, the plunger is arranged in the opening arranged at the lower end face of the lower air piston, the upper cover is fixedly connected to the upper end face of the hydraulic cylinder housing, the upper air piston is disposed in the upper cover with sliding fit, a containing chamber is defined by the lower end face of the upper air piston, the upper end face of the lower air piston and the hydraulic cylinder housing. By adopting such structure, the gas-liquid auxiliary supporter can provide support when the dry granulator runs, and the supporting force can be withdrawn when dry granulator stops, and the supporting force provided can be kept at a constant value to ensure the dry granulator works stably.

6 Claims, 4 Drawing Sheets

(56) References Cited

FOREIGN PATENT DOCUMENTS

| | | | |
|---|---|---|---|
| CN | 201258891 Y | 6/2009 |
| CN | 201272047 Y | 7/2009 |
| CN | 201300050 Y | 9/2009 |
| CN | 102188930 A | 9/2011 |
| CN | 202070321 U | 12/2011 |
| DE | 10322610 A1 | 12/2004 |
| GB | 1182388 A | 2/1970 |

OTHER PUBLICATIONS

First Office Action dated Aug. 29, 2013, issued by the State Intellectual Property Office of the People's Republic of China, in corresponding Chinese Patent Application No. CN-2011101063771, with English translation (5 pages).

Search Report contained in the First Office Action dated Aug. 29, 2013, issued by the State Intellectual Property Office of the People's Republic of China, in corresponding Chinese Patent Application No. CN-2011101063771, with English translation (3 pages).

* cited by examiner

GAS-LIQUID AUXILIARY SUPPORTER FOR A DRY GRANULATOR

FIELD OF THE INVENTION

The present invention relates to a gas-liquid auxiliary supporter and more particularly, to a gas-liquid auxiliary supporter for dry granulators.

DESCRIPTION OF THE PRIOR ART

For the preparation process of a dry granulator, an auxiliary supporter is typically used beneath the body of the dry granulator to support it. When the dry granulator runs, the auxiliary supporter holds up the granulator body and, when the dry granulator stops the auxiliary supporter has to be removed. The prior supports for dry granulators used around the world are mainly elastic auxiliary supporters with spring structures. An auxiliary supporter is only required during the use of a dry granulator and it has to be removed when the dry granulator stops. When using an elastic auxiliary supporter with a spring structure it may complicate the preparation process, and in the operation the elastic auxiliary supporter will develop an elastic adjustment with the increasing body gravity, which makes it unable to keep the supporting force against the granulator body at a constant value. Over time the dry granulator cannot work in stably while it is being operated.

SUMMARY OF THE INVENTION

Accordingly, it is an objective of the present invention to provide a gas-liquid auxiliary supporter for dry granulators; the gas-liquid auxiliary supporter can provide support as the dry granulator runs and the supporting force can be withdrawn when the dry granulator stops. In addition, the supporting force provided can be maintained at a constant value.

To realize the object described herein, the present invention provides a gas-liquid auxiliary supporter for dry granulator, which includes a hydraulic cylinder housing, a lower air piston, a plunger, an upper cover and an upper air plug; the hydraulic cylinder housing is arranged with a hydraulic oil inlet and the lower air piston is arranged with an oil channel for hydraulic oil to flow through; an opening arranged at one end of the oil channel is connected to the hydraulic oil inlet of the hydraulic cylinder housing; an opening at the other end of the oil channel is arranged on a lower end face of the lower air piston and the plunger is arranged in the opening; the upper cover is securely connected to the upper end face of the hydraulic cylinder housing; the upper air piston is fitted into the upper cover with sliding fit; and a containing chamber is defined by the lower end face of the upper air piston, the upper end face of the lower air piston and the hydraulic cylinder housing.

The benefits of the present invention are as described: by adopting the structure as described above, when the dry granulator runs the gas-liquid auxiliary supporter is required to provide support. Hydraulic oil is led into the hydraulic oil inlet of the hydraulic cylinder housing through which the hydraulic oil flows into the oil channel of the lower air piston. While the hydraulic oil accumulates due to the disposal of the plunger at the opening at the other end of the oil channel, the lower air piston is thereby pushed in an upward movement and compresses the gas in the containing chamber. This then pushes the upper air piston upwards until the upper end face of the air piston is pushed outwards and applies a constant supporting force to the granulator body. When the dry granulator stops the pressure from the hydraulic oil is withdrawn and the upper air piston and the lower air piston both automatically drop back to their original position. Thus, a gas-liquid auxiliary supporter can provide support when the dry granulator runs and can withdraw the supporting force when the dry granulator stops. In addition, the supporting force can be maintained at a constant value to ensure the dry granulator works stably.

The present invention can also be arranged so that that the upper air piston has an outer circumferential surface with a step. A shoulder mating the step surface is arranged on the inner circumferential surface of the upper cover. A cushioning air chamber between the upper air piston and the upper cover is defined by the shoulder of the upper cover, the step surface of the upper air piston, the inner circumferential surface of the upper cover and the outer circumferential surface of the upper air piston.

By adopting such a structure, a cushioning air chamber can be additionally arranged between the upper air piston and the upper cover and as such the upper air piston can have a cushion when pressed by the gas in the containing chamber.

The present invention can also arranged as such that a concave cavity is placed at the lower end face of the upper air piston and bores are arranged at the upper end face of the lower air piston.

By adopting such a structure the space for containing gas in the containing chamber can be enlarged.

The present invention can also be arranged so that a plate is fixed on the upper end face of the upper air piston.

By adopting such a structure the stressed area of the supporting force from the upper air piston applied to the granulator body can be enlarged and spread out.

The present invention can also be arranged so that the sealing rings are arranged between the upper air piston and the upper cover, between the upper cover and the hydraulic cylinder housing, between the plunger and the lower air piston, and, between the lower air piston and the hydraulic cylinder housing, respectively.

DETAILED DESCRIPTION OF THE PREFERRED EMBODIMENTS

Figure 1:
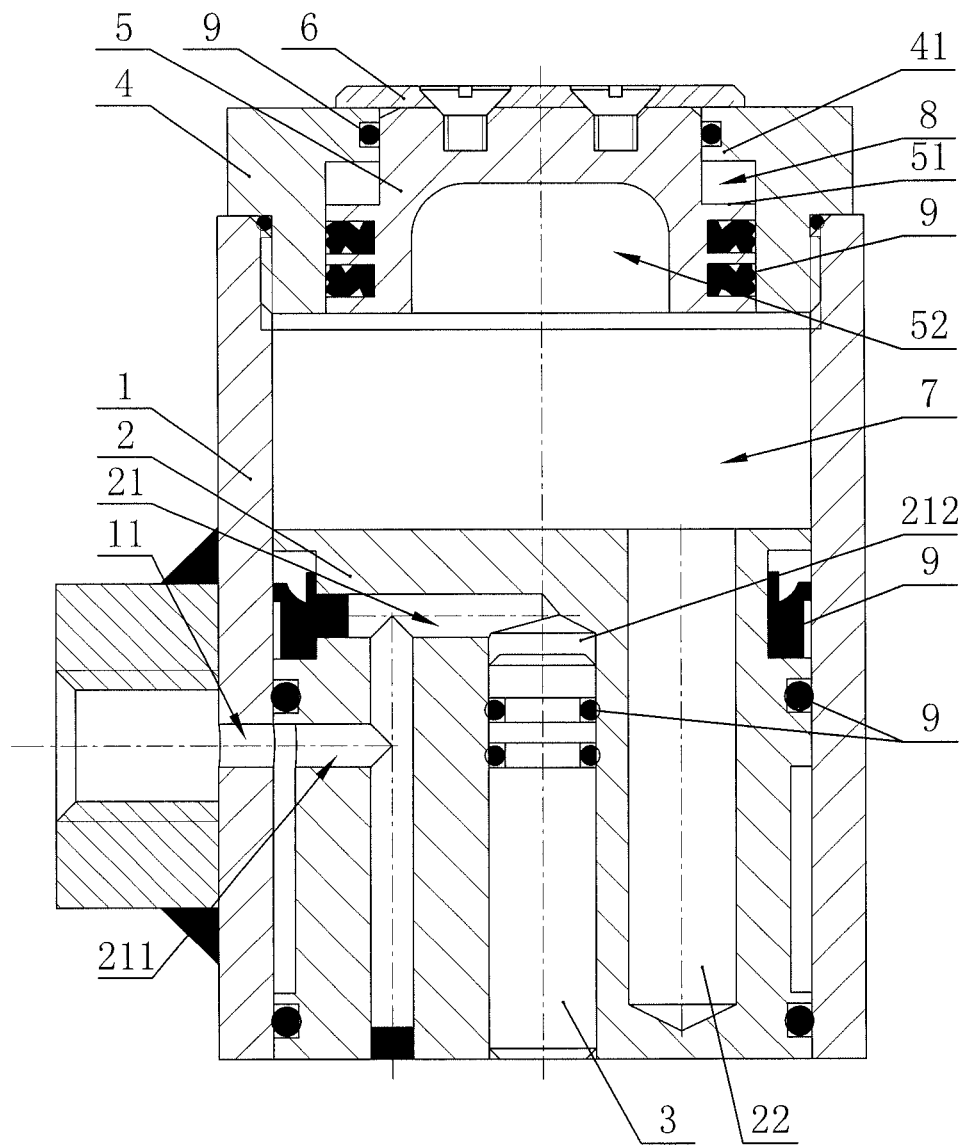
FIG. 1 is a structural view of the sections of the present invention.
Figure 2:
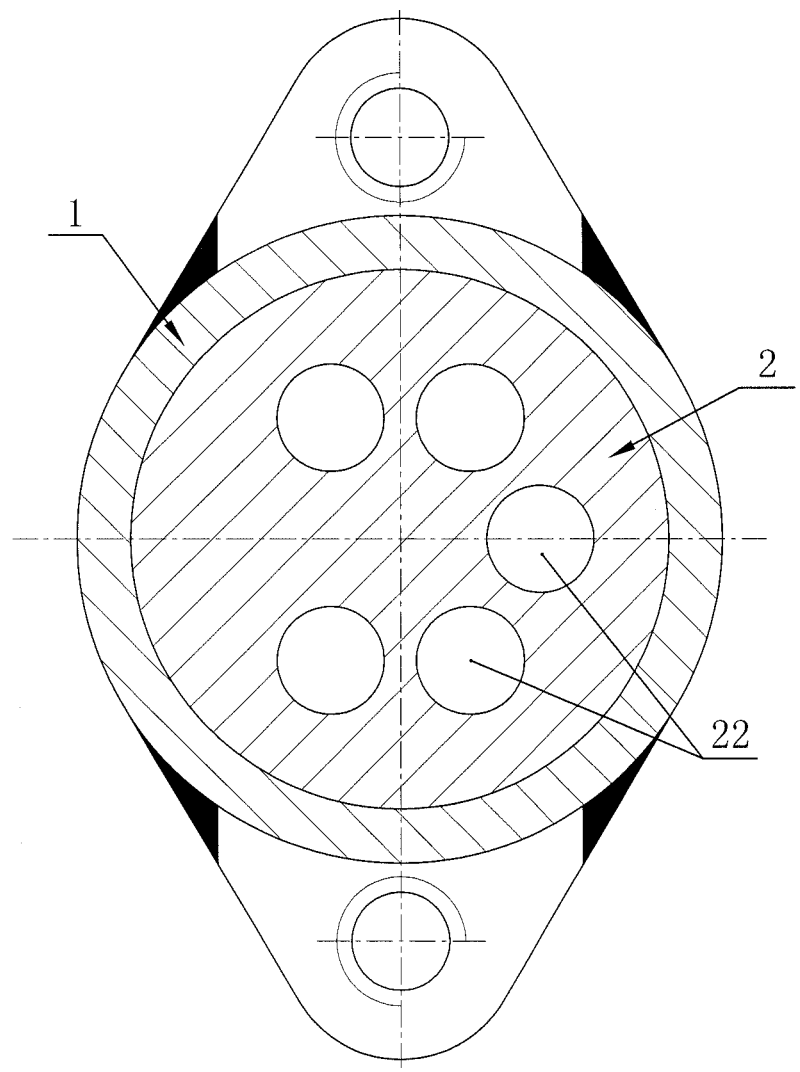
FIG. 2 is a top view of the present invention.
Figure 3:
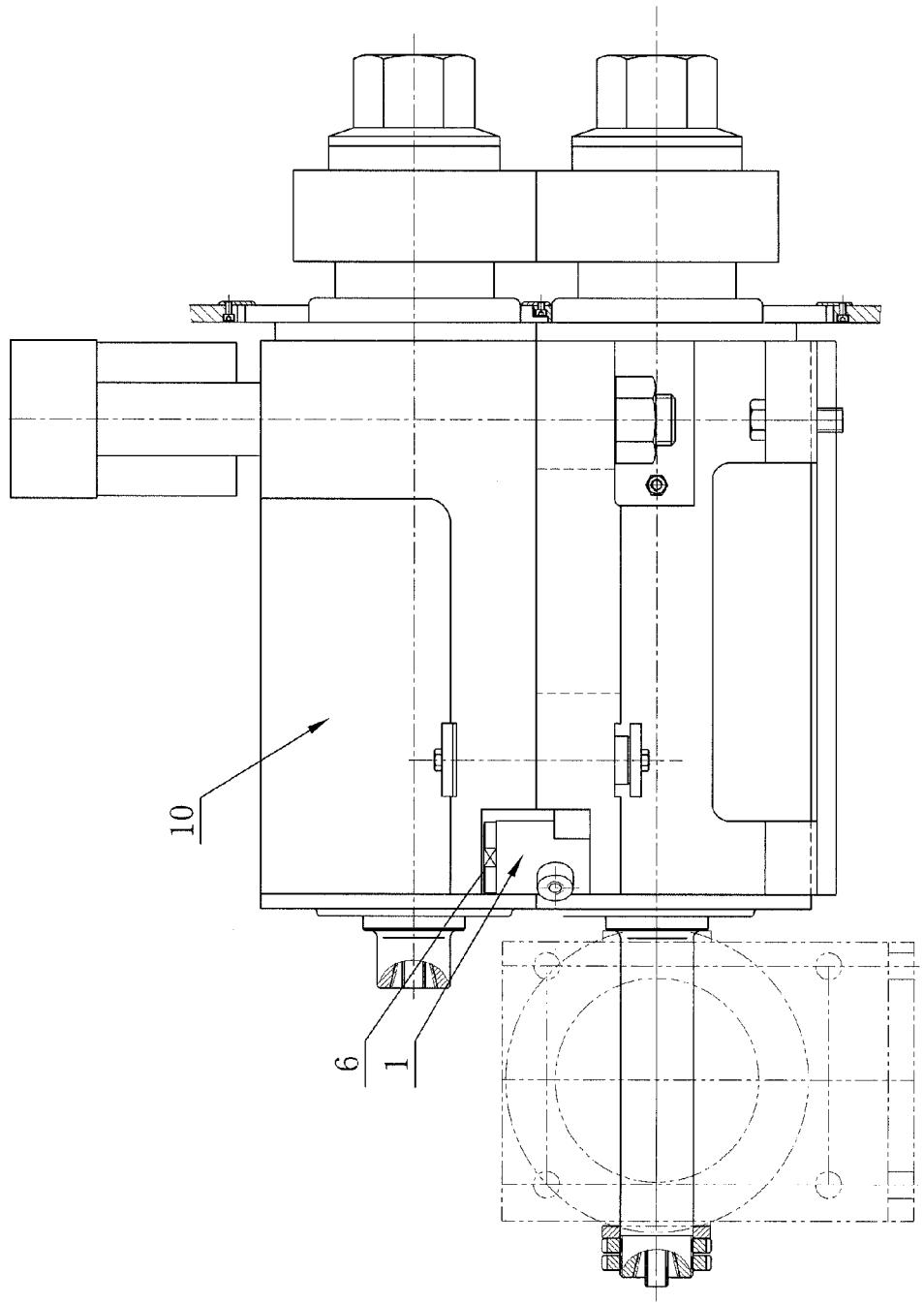
FIG. 3 is a structural diagram of an embodiment of the present invention.
Figure 4:
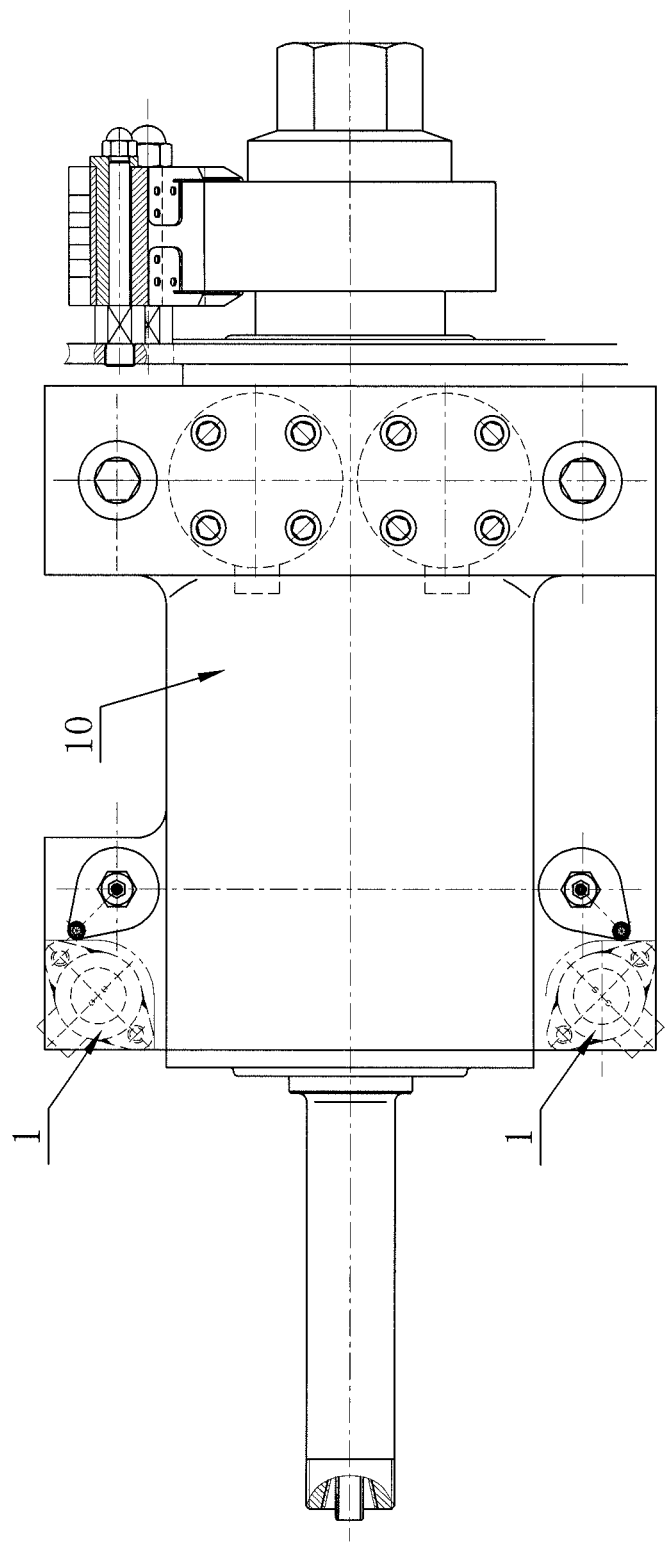
FIG. 4 is a structural diagram of an embodiment of the present invention.

Referencing to FIG. 1-4 which illustrate a gas-liquid auxiliary supporter including a hydraulic cylinder housing 1, a lower air piston 2, a plunger 3, an upper cover 4, an upper air piston 5 and a plate 6, the hydraulic oil inlet 11 is arranged on the hydraulic cylinder housing 1 and the lower piston 2 is arranged with an oil channel 21 for hydraulic oil to flow through; an opening 211 arranged at one end of the oil channel 21 is connected with the hydraulic oil inlet 11 of the hydraulic cylinder housing 1, an opening 212 at the other end of the oil channel 21 is arranged on the lower end face of the lower air piston 2 and the plunger 3 is arranged therein; the upper cover 4 is fixed to the upper end face of the hydraulic cylinder housing 1; the upper air piston 5 is fitted into the upper cover 4 with sliding fit; the plate 6 is fixed on the upper end face of upper air piston 5; the lower end face of the upper air piston 5, the upper end face of the lower air piston 2 and the hydraulic cylinder housing 1 create a containing chamber 7 in between. The upper air piston 5 has an outer circumferential surface with a step and a shoulder 41 mating the step surface 51 is arranged on the inner circumferential surface of the upper cover 4, and a cushioning air chamber 8 between the upper air piston 5 and the upper cover 4 is defined by the shoulder 41 of the upper cover 4, the step surface 51 of the upper air piston 5, the inner circumferential surface of the upper cover 4 and the outer circumferential surface of the upper air piston 5. The lower end face of upper air piston 5 is arranged with a concave cavity 52, and the upper end face of lower air piston 2 is arranged with bores 22. Sealing rings 9 are arranged between upper air piston 5 and upper cover 4, between upper cover 4 and hydraulic cylinder housing 1, between plunger 3 and lower air piston 2, between lower air piston 2 and hydraulic cylinder housing 1, respectively. In order to realize smoother sliding between upper air piston 5 and upper cover 4, and between lower air piston 2 and hydraulic cylinder housing 1, the sealing rings 9 between upper air piston 5 and upper cover 4, and between lower air piston 2 and hydraulic cylinder housing 1, are preferably chosen to be special sealing rings for a pneumatic air piston.

By adopting such a structure, when the dry granulator runs, the gas-liquid auxiliary supporter is required to provide support where the hydraulic oil is fed into the hydraulic oil inlet 11 of the hydraulic cylinder housing 1 through which the hydraulic oil flows into the oil channel 21 of the lower air piston 2. While the hydraulic oil accumulates due to the disposal of the plunger 3 at the other end 212 of the oil channel 21 the lower air piston 2 is thereby pushed in an upward movement and compresses the gas in the containing chamber 7 which then pushes the upper air piston 5 to move upwards until the upper end face of the upper air piston 5 is directed outwards with respect to the upper cover 4. This then applies a constant supporting force to the granulator body 10. When the dry granulator stops the pressure from the hydraulic oil is withdrawn and the upper air piston 5 and the lower air piston 2 both automatically drop back to their original position. Thus, a gas-liquid auxiliary supporter can provide support to the granulator body 10 when the dry granulator runs and can withdraw the supporting force to the granulator body 10 when the dry granulator stops. In addition, the provided supporting force to the granulator body 10 can be maintained at a constant value to ensure the dry granulator works stably while it is being operated.

What is claimed is:

1. A gas-liquid auxiliary supporter for dry granulators, characterized in that the gas-liquid auxiliary supporter comprises a hydraulic cylinder housing, a lower air piston, a plunger, an upper cover, and an upper air piston; wherein the hydraulic cylinder housing has a hydraulic oil inlet, and the lower air piston has an oil channel for hydraulic oil to flow through; a first opening at one end of the oil channel is connected to the hydraulic oil inlet, while a second opening at the other end of the oil channel is arranged on a lower end face of the lower air piston and the plunger is disposed inside the second opening; the upper cover is fixed to an upper end face of the hydraulic cylinder housing; the upper air piston is fitted into the upper cover with sliding fit; a containing chamber is defined by a lower end face of the upper air piston, an upper end face of the lower air piston and the hydraulic oil cylinder housing, wherein the upper air piston has an outer circumferential surface with a step, and a shoulder mating the step surface is arranged on an inner circumferential surface of the upper cover; a cushioning air chamber between the upper air piston and the upper cover is defined by the shoulder of the upper cover, the step surface of the upper air piston, the inner circumferential surface of the upper cover and the outer circumferential surface of the upper air piston.

2. The gas-liquid auxiliary supporter for dry granulators according to claim 1, wherein sealing rings are arranged between the upper air piston and the upper cover, between the upper cover and the hydraulic cylinder housing, between the plunger and the lower air piston, and, between the lower air piston and the hydraulic cylinder housing, respectively.

3. The gas-liquid auxiliary supporter for dry granulators according to claim 1, wherein a concave cavity is arranged on the lower end face of the upper air piston and bores are arranged on the upper end face of the lower air piston.

4. The gas-liquid auxiliary supporter for dry granulators according to claim 3, wherein sealing rings are arranged between the upper air piston and the upper cover, between the upper cover and the hydraulic cylinder housing, between the plunger and the lower air piston, and, between the lower air piston and the hydraulic cylinder housing, respectively.

5. The gas-liquid auxiliary supporter for dry granulators according to claim 1, wherein a plate is also included and the plate is fixed on an upper end face of the upper air piston.

6. The gas-liquid auxiliary supporter for dry granulators according to claim 5, wherein sealing rings are arranged between the upper air piston and the upper cover, between the upper cover and the hydraulic cylinder housing, between the plunger and the lower air piston, and, between the lower air piston and the hydraulic cylinder housing, respectively.

\* \* \* \* \*